United States Patent [19]
Alonso-DeBolt et al.

[11] Patent Number: 5,945,386
[45] Date of Patent: Aug. 31, 1999

[54] GLYCOL AND GLYCOL ETHER LUBRICANTS AND SPOTTING FLUIDS

[75] Inventors: Maria A. Alonso-DeBolt, Kingwood; Ronald G. Bland, Houston; Bong Jin Chai, Houston; Peter B. Eichelberger, Houston; Eugene A. Elphingstone, Missouri City, all of Tex.

[73] Assignee: Baker Hughes Incorporated, Houston, Tex.

[21] Appl. No.: 08/978,952

[22] Filed: Nov. 26, 1997

Related U.S. Application Data

[63] Continuation of application No. 08/627,828, Apr. 2, 1996, abandoned, which is a continuation of application No. 08/222,804, Apr. 5, 1994, abandoned.

[51] Int. Cl.$^6$ ................................ C09K 7/02; C09K 3/00
[52] U.S. Cl. ........................... 507/136; 507/261; 507/928
[58] Field of Search ................................. 507/136, 261, 507/928

[56] References Cited

U.S. PATENT DOCUMENTS

| | | | |
|---|---|---|---|
| 3,723,311 | 3/1973 | Lummus | 507/136 |
| 3,920,559 | 11/1975 | Etling | 507/136 |
| 4,614,235 | 9/1986 | Kenner et al. | 507/136 |
| 5,318,955 | 6/1994 | Mueller et al. | 507/138 |

FOREIGN PATENT DOCUMENTS 2535802  8/1975  Germany.

*Primary Examiner*—Philip Tucker
*Attorney, Agent, or Firm*—Cantor Colburn LLP

[57] ABSTRACT

A non polluting additive or spotting fluid which lubricates, releases and/or prevents differentially stuck drill strings and casings in the wellbore of a subterranean well is presented. This additive composition comprises a glycol or glycol ether derived from a long chain epoxide of greater than 3 carbon atoms (preferably greater than 10 carbon atoms); and preferably comprises the reaction product between 2-ethylhexanol and the epoxide of 1-hexadecene. The present invention enhances the lubricity of a drilling fluid to prevent drill string sticking and when utilized as a spotting agent reduces the time required to release a stuck pipe. This invention also helps reduce or prevent foaming. By eliminating the need for traditional oil-based components, the present invention is nontoxic to marine life, biodegradable, environmentally acceptable, easy to prepare, and capable of being disposed of at the drill site without costly disposal procedures.

30 Claims, No Drawings

GLYCOL AND GLYCOL ETHER LUBRICANTS AND SPOTTING FLUIDS

This is a continuation of application Ser. No. 08/627,828 filed on Apr. 2, 1996 now abandoned which is a continuation of Ser. No. 08/222,804 filed on Apr. 5, 1994 now abandoned.

BACKGROUND OF THE INVENTION

This invention relates generally to a lubricant and spotting fluid; and method for lubricating and/or dislodging a stuck drill string or casing during downhole drilling operations, and more particularly to an aqueous-based spotting fluid and lubricant comprised of a glycol or glycol ether based on long chain epoxides (e.g. $C \geq 3$ and more preferably $\geq 10$). A preferred composition in accordance with this invention is the reaction product between the epoxide of 1-hexadecene and 2-ethylhexanol.

During drilling operations the drill string may become stuck and cannot be raised, lowered, or rotated. One mechanism for causing this problem is known as differential sticking.

Differential sticking may be defined as the sticking of the drill string against a permeable formation containing less pore fluid pressure than the hydrostatic pressure exerted by the drilling fluid column and usually occurs when the drill string remains motionless for a period of time. The mechanism by which this occurs involves the drill string coming into contact with the permeable zone, remaining quiescent for a period of time sufficient for mud cake to build up on each side of the point of contact, thus sealing the pipe against the borehole. The annular pressure exerted by the drilling fluid then holds the pipe against the borehole or the permeable zone.

Freeing of differentially stuck pipe is essentially a matter of reducing this pressure differential which exists across the pipe. One method used simply involves a reduction in fluid pressure by replacing the annular fluid with a less dense fluid allowing for less pressure differential to exist between the borehole and annulus. In some cases the borehole pressure may exceed the annular pressure which in turn allows the pipe to be blown away from the borehole.

One commonly used method to release stuck pipe is the use of a "spotting" fluid in the hole opposite the stuck section of pipe. The spotting fluid may penetrate between the mud cake and pipe lubricating the area between the pipe and borehole resulting in less friction and quicker release. More often than not, an extensive period of time is necessary for this to occur which results in an expensive loss of rig time.

As mentioned above, spotting fluids were developed to lubricate the affected area, "spotting" referring to the placement of a quantity of drilling fluid known as a pill or slug containing a release agent at the area of concern. Furthermore, incorporating a lubricating factor into the drilling mud during ordinary operation to prevent drill pipe sticking is a common practice.

The composition of these release agents has generally consisted of various kinds of oils such as synthetic oils, vegetable oils, mineral oils, diesel oils and crude oils. Oil-based spotting fluids, however, are generally difficult to prepare because strong agitation is required to achieve an oil-water suspension taking much time when time may be a crucial consideration.

Disposal of drilling fluids containing oil components has also come under much closer environmental scrutiny and regulation concurrent with increasing concern about reducing pollutants in ground water and coastal water environments. Drilling muds containing oil are generally classified as pollutant streams having costly regulated disposal procedures. Such oils are not in the best interest of marine wild life and may leave an unsightly sheen in the water.

Accordingly, there is an urgent need for a spotting fluid release agent and lubricant in the art of oil and gas production which is nontoxic, non-oil based, inexpensive and easy to prepare and use.

Examples of non-oil based spotting fluids and lubricants proposed are found in U.S. Pat. Nos. 4,964,615; 5,002,672; 5,120,708; 5,127,475; 4,230,587; 4,466,486; 4,494,610; 4,614,235; and 4,659,486. U.S. Pat. No. 4,964,615 to Mueller et al describes a composition for freeing jammed drill strings and pipes which utilizes a fatty acid alkyl ester or mixtures of esters as well as at least one thickener and at least one emulsifier. In a preferred embodiment, the Mueller et al patent describes the use of ester of oleic acid with 2-ethyl hexanol as a preferred fatty acid alkyl ester for use in the spotting fluid described therein.

U.S. Pat. Nos. 5,002,672 and 5,127,475 to Hayes et al both describe an aqueous-based spotting fluid composition which utilizes a glycerophosphoric acid ester and a diacetyl-tartaric acid ester of mono and/or diglycerides. U.S. Pat. No. 4,230,587 to Walker discloses a stuck drill pipe spotting fluid comprising polyethylene glycol while the Walker U.S. Pat. No. 4,466,486 utilizes a stuck drill pipe spotting fluid comprising a polymer (cellulose or polyethylene oxide). The Walker U.S. Pat. No. 4,494,610 utilizes an alcohol based spotting fluid while U.S. Pat. No. 4,614,235 lo Keener et al is an ether based spotting fluid employing an alkylene glycol ether of the class consisting of alkylene glycol ether, poly (alkylene glycol) ether and mixtures thereof. U.S. Pat. No. 4,659,486 to Harmon discloses a polyester based drilling fluid. One notably successful attempt at overcoming the deficiencies of the prior art is the water-based drilling fluid additive composition sold by BH INTEQ Fluids Technology division of Baker Hughes, Incorporated of Houston, Tex. under the trademark AQUA MAGIC, the composition of which is described in detail in U.S. Pat. No. 5,120,708, assigned to the assignee hereof and fully incorporated herein by reference. The drilling fluids additive of U.S. Pat. No. 5,120,708 comprises (a) a water soluble polyoxyalkylene compound selected from polyoxyalkylene glycols, monoalkylethers of polyoxyalkylene glycols, and mixtures thereof in combination with (b) a water dispersible particulate asphalt.

Notwithstanding the foregoing description of water-based drilling fluid additives, there continues to be a need for water-based drilling fluid components and additives which exhibit improved environmental properties such as biodegradability and low toxicity without sacrificing functional operability such as the provision of lubrication and/or spotting. While glycols and glycol ethers are water-based and are known and used for drilling fluid additives, such compositions continue to suffer from serious drawbacks and deficiencies. This is because glycols and glycol ethers, when suggested for use as drilling fluid additives, have been based either on ethylene oxide or propylene oxide chemistry. Additives based on ethylene oxide such as described in U.S. Pat. No. 4,230,587 to Walker exhibit several deleterious properties including poor efficiency, foaming, undesirable toxicity levels and health hazards and are relatively expensive. Additives based on propylene oxide are often not sufficiently biodegradable to meet regulatory requirements.

SUMMARY OF THE INVENTION

The above-discussed and other drawbacks and deficiencies of the prior art are overcome or alleviated by the non polluting additive or spotting fluid of the present invention which lubricates, releases and/or prevents differentially stuck drill strings and casings in the wellbore of a subterranean well. This additive composition Comprises a glycol or glycol ether which is based neither on ethylene oxide chemistry or propylene oxide chemistry. Instead, the drilling fluid additive of this invention comprises a glycol or glycol ether based on long chain epoxides (C≧3 and preferably ≧10). in general, the additive of this invention may be characterized by the formula:

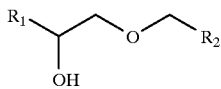

where $R_1$ and $R_2$ can be long chain hydrocarbons from $C_1$ to $C_{18}$

Preferred glycol ethers include those having straight chains with little or no branching to aid in biodegradability and particularly α-epoxides have greater than 10 carbon atoms. Presently the most preferred additive is the reaction product between a C16 alpha epoxide (e.g., oleyl alcohol epoxylate or the epoxide of 1-hexadecene) and 2-ethylhexanol.

The glycol and glycol ether drilling fluid additives of the present invention are non-toxic, exhibit good biodegradability, reduce or prevent foaming and act as an effective lubricant and spotting fluid.

In addition to the novel glycol ether component, when used as a spotting fluid, other preferred components for use in a drilling fluid in accordance with the present invention include one or more suitable surfactants, suspension agents such as organic clays, alkilinity control additives such as lime (Ca (OH)$_2$), anticaking and grinding agents such as calcium silicate and antigellation agents such as sodium bicarbonate.

In one embodiment, the present invention comprises a spotting fluid concentrate composition suitable for use in downhole drilling operations in a pill for releasing periodically stuck drill string. The concentrate comprises the novel glycol and glycol ether described above together with the remaining optional surfactants, suspension agents, anticaking and grinding agents and antigellation agents.

In another embodiment, the present invention is a pill composition comprising the spotting fluid concentrate and a weighing agent for adjusting the density of the concentrate. The concentrate comprising all aqueous dispersion and/or solution of the novel glycol and glycol ether described above together with the remaining optional surfactants, suspension agents, anticaking and grinding agents and antigellation agents.

In a further embodiment, the present invention comprises a method for lubricating a downhole well drilling operation comprising the steps of: mixing a spotting fluid concentrate with a drilling mud and circulating the mud mixture through the well. The concentrate comprising an aqueous dispersion and/or solution of the novel glycol and glycol ether described above together with the remaining optional surfactants, suspension agents, anticaking and grinding agents and antigellation agents. The drilling mud comprises the concentrate in an amount of from about 0.1 to about 15 percent by volume of the drilling mud, preferably from about 0.3 to about 8 percent by volume of the drilling mud.

In yet another embodiment, the present invention comprises a method for mixing a spotting fluid pill, comprising the steps of: mixing the novel glycol and glycol ether with optional suspension agents, anticaking and grinding agents and antigellation agents and conditioning the aqueous dispersion with a weighing agent.

In yet a further embodiment, the present invention includes a method for releasing a stuck drill assembly in a downhole well drilling operation comprising the steps of preparing a pill of a spotting fluid composition; displacing a drilling fluid in the well with the pill in an amount sufficient to contact the well bore with the pill adjacent the location of the sticking; displacing the drilling fluid with an additional quantity of the pill until the drill assembly is free to move; and circulating the drilling fluid to incorporate the pill into the fluid. The pill composition comprises the novel glycol and glycol ether described above together with the remaining optional surfactants, suspension agents, anticaking and grinding agents and antigellation agents and a weighing agent. The method may also include vertically working the drill assembly during the initial displacing step; and further removing the drill assembly prior to the circulating step and staging back into the well with the freed drill assembly.

The present invention thus enhances the lubricity of a drilling fluid to prevent drill string sticking and when utilized as a spotting agent reduces the time require to release a stuck pipe. By eliminating the need for oil-based components, the present invention is nontoxic to marine life, environmenlally acceptable, easy to prepare, and capable of being disposed of at the drill site without costly disposal procedures.

The above-discussed and other features and advantages of the present invention will be appreciated and understood by those skilled in the art from the following detailed description.

BRIEF DESCRIPTION OF THE DRAWINGS

The single drawing FIGURE depicts favorable biodegradability characteristics of the drilling fluids additive in accordance with the present invention.

DESCRIPTION OF THE PREFERRED EMBODIMENT

The present invention comprises a lubricating and spotting fluid composition free from mineral oils for freeing jammed drill strings and casings, comprising a novel glycol and glycol ether derived or based on a long chain epoxide (C≧23 and preferably ≧10). In addition, when used as a spotting fluid, the drilling composition may include one or more surfactants, anticaking agents, grinding agents, suspension agents and antigelling agents.

The glycols and glycol ethers used in the composition of this invention are based on long chain epoxides of at least 3 (and preferably 10) carbons and have the general formula of:

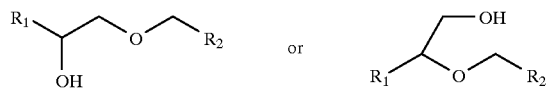

where $R_1$ and $R_2$ can be straight chain or very low branching aliphatic compounds of $C_1$ to $C_{18}$.

Examples of such glycols and glycol ethers include the reaction product between an alpha epoxide such a VICOLOX 10, 12, 14, 16 or 18 available from Elf Atochem of Bloomington, Minn. and tripropylene glycol bottoms, oleyl alcohol and ethoxylated alcohols, including more specifically alcohols such as butanol, pentanol, propanol, ethanol, hexanol and heptanol. A preferred composition is the glycol ether derived from the following reaction of 2-ethylhexanol and the epoxide of 1-hexadecene:

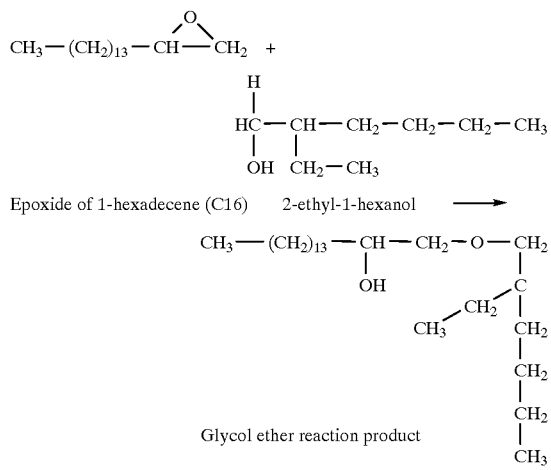

The epoxide of 1-hexadecene is commercially available under the trademark VICOLEX 16 from Elf Atochem. The 2-ethylhexanol is also commercially available from Ashland Chemical Co. or Chem Control.

It is believed that the above glycol ether reaction product is based on one mole additions of the 2-ethylhexanol and oleyl alcohol epoxylate. Since the epoxy ring of the epoxylate component can open in two ways, the one mole addition products apparently consist of two isomers (I and II below). The relative ratios of the primary to secondary hydroxyls indicate that the two isomers are in a ratio of 60/40 I:II

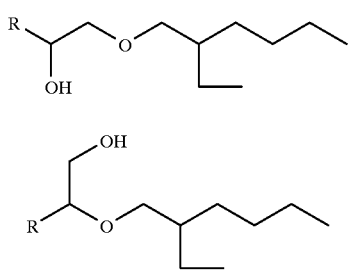

As discussed in more detail in the examples which follow, the glycols and glycol ether additives of this invention are non-toxic, exhibit acceptable biodegradability and function as an effective lubricant for a drill string. As a lubricating fluid, the present invention reduces the prevalence of drill string sticking. To prepare a lubricating fluid, an aqueous solution of the novel glycol or glycol ether (or mixture thereof) is formulated. The lubricating fluid is blended into the drilling mud, i.e., circulated in the welibore during drilling. Typically, the lubricating fluid thus comprises an aqueous medium having from about 1 to about 15 volume % of the drilling fluid additive of this invention.

While the present invention is primarily contemplated as a lubricant, it is believed that the additive composition of this invention may also find utility as a spotting fluid and would then be used with additional, known components such as anticaking and grinding agents (such as calcium silicate), antigellation agents (such as sodium bicarbonate), suspension agents (such as organic clays), and alkilinity control additives (such as lime (Ca $(OH_2)$)).

To prepare a pill, a mixing pit or tank is preferably cleaned to avoid unnecessary contamination. Clean water is pumped through the mixing manifolds to flush out all the residual drilling mud. Waste water is dumped from the tank and lines. Spotting fluid concentrate and barite or other weighting agents are then mixed in the desired proportions.

When it becomes necessary to release a stuck drill string and time is critical, a spotting fluid pill comprising the aqueous-based concentrate suitably conditioned is prepared. The finished spotting fluid should be pumped down the drill string into the open hole in sufficient quantity to immerse the entire annular interval affected. The affected region is typically soaked with the fluid for a sufficient time period. An additional quantity of fluid should be pumped periodically to insure adequate soaking and the string should be worked vertically. When the pipe is free, it is pulled up from the problem zone leaving the spotting fluid to lubricate and seal the low pressure sand formation. The drill string is staged back into the hole and the drilling fluid is circulated to incorporate the spotting fluid pill as lubricant on the mud. The mud may be further conditioned with alkalinity control agent, thinner, defoamer and the like as needed.

The present invention is further illustrated by the following examples.

PREPARATION

The following Example 1 provides a procedure for preparing a glycol/glycol ether based on long chain epoxides of $\geq$ than 3 (preferable $\geq$10) carbons; and particularly provides the aforementioned reaction product between the epoxide of 1-hexadecene and 2-ethylhexanol.

STARTING MATERIALS

Epoxide of 1-hexadecene - VICOLEX 16 2-ethylhexanol - Chem Control, Code UN 1987.

PROCEDURE

Into a 2 liter 4 neck round bottom flask equipped with a thermocouple, thermometer, mechanical stirrer, a $N_2$ inlet and a gas outlet, 429 g of alcohol were placed. The alcohol was heated up to 127° under $N_2$; then, kept at this temperature for 1 hour followed by cooling to 55° C. Next, 6 ml of $BF_3Et_2O$ were added. Then, the temperature was raised to 85° C. and the epoxy (721.2 g) was added between 85–90° C. over a period of 1 hour. The temperature was then raised to 90° C. and stirred and heated under $N_2$ for 3½ hours. Then heating was stopped and the reaction next was allowed to stand at room temperature under $N_2$. 200 ml of distilled water was added and the solution stirred. The layer was then separated and dried over sodium sulfate. Then, the organic layer (containing the desired reaction product) was filtered and the unreacted alcohol was removed under vacuum.

TOXICITY

A drilling fluid sample of Generic Mud No. 7 (as described in Table 1) containing 5% of the reaction product of Example 1 was submitted for a 96 hour range finding lest using EPA protocol for toxicity testing of drilling fluids. The range finding test consists of a 1:9 dilution of mud to seawater. After mixing and then allowing the solution to settle for one hour, the suspended particulate phase (SPP) is decanted and further diluted in one liter dishes to 1.0%, 3.0%, 10%, 25% and 50% solutions. The test dishes contain twenty-three to six day old mysid shrimp (Mysidopsis bahia) and the test is conducted for 96 hours. The results from this range finding test were conducted on two separate samples of Example 1. The test results indicate a $LC_{50}$ of approximately 500,000 ppm for the first sample and 100,000 to 250,000 ppm SSP for the second sample. These test results are well within the criteria for non-toxicity as defined in the EPA protocol.

TABLE 1

GENERIC NO. 7 MUD FORMULATION

| PRODUCT | CONCENTRATION, LB/Bbl |
|---|---|
| DI Water | 150 |
| MILGEL[1] | 20 |
| UNICAL[1] | 5.0 |
| LIGCO[1] | 3.0 |
| Soda Ash | 1.0 |
| NaOH (as 50% solution) | 1.6 (as 100%) |
| Seawater | 150 |
| MILPAC[1] Reg. | 0.5 |
| MIL-BAR[1] | 178.5 |

[1]Trademark of Baker Hughes, Inc.
Pre-hydrate MILGEL in DI water arid as slurry is mixing, add components in order listed.

BIODEGRADABILITY

The biodegradability of the reaction product of Example 1 was tested using the 28 day "Closed Bottle Method". This method is accepted by the Organization of Econoinic Corporation and Development (OECD) and all testing was conducted in accordance with Good Laboratory Practice. In the 28 day Closed Bottle Method, nutrient enriched natural seawater is used as the dilution water. Micro-organisiis that are already present in the seawater are used as the inoculum. One concentration of the test material is added to the nutrient enriched seawater and the dissolved oxygen is measured at 0, 5, 15 and 28 days. A reference material, sodium benzoate is also tested using the same parameters as the test material. The sea water collected for these experiments is described in Table 2.

The sample of Example 1 was analyzed and this material was determined to be insoluble, therefore a micropipetor was used to inoculate each test bottle. After 28 days, 2 $\mu l/l$ of Example 1 degraded 74.16% and 2 mg/l of sodium benzoate degraded 87.57% under the same conditions.

Tables 3 and 4 show the statistical analysis of the dissolved oxygen data. FIG. 1 illustrates the biodegradation of Example 1 over time. These tests demonstrate that the drilling fluid additive of this invention exhibits excellent biodegradability characteristics.

TABLE 2

| Collection site | National Marine Fisheries Services Galveston, TX |
|---|---|
| Depth | approx. 6 feet |
| Appearance | Clear with slight green tinge |
| Salinity, 0/00 | 37 |
| Temperature, °C. | 22 |
| Dissolved Oxygen, mg/l | 7.2 |
| pH | 8.4 |
| Total organic carbon | Not detected; 080393 |
| Microbial count | 77,000 |
| $NO_3$, ppm | 0 |
| $PO_4$, ppm | 0 |
| $NH_4$, ppm | 0 |
| Time between collection and use | 48 hrs. |

TABLE 3

DISSOLVED OXYGEN (mg/l)

| | | DAY 0 | DAY 5 | DAY 11 | DAY 28 |
|---|---|---|---|---|---|
| BLANK | #1 | 7.20 | 6.90 | 6,50 | 6.00 |
| | #2 | 0.00 | 6.85 | 6.50 | 6.85 |
| | MEAN | 7.20 | 6.88 | 6.50 | 6.43 |
| 2 ul/l | #1 | 7.20 | 6.40 | 5.20 | 2.90 |
| | #2 | 0.00 | 5.90 | 3.70 | 3.70 |
| | MEAN | 7.20 | 6.15 | 4.45 | 3.30 |
| Sodium | #1 | 7.20 | 4.70 | 4.00 | 3.50 |
| Benzoate | #2 | 0.00 | 4.50 | 4.20 | 3.50 |
| | MEAN | 7.20 | 4.60 | 4.10 | 3.50 |
| Toxicity | #1 | | 3.60 | 2.00 | 0.80 |
| Reference | #2 | | 4.15 | 1.40 | 1.20 |
| | MEAN | | 3.88 | 1.70 | 1.00 |

ThOD Sodium Benzoate 1.67
COD 2.107
% Oxygen Depletion in Blank 11

TABLE 4

OXYGEN DEPLETION (D.O. DEP) & % degradation (1% D)

| | | DAY 5 | DAY 11 | DAY 28 |
|---|---|---|---|---|
| 2 ul/l | D.O. DEP | 0.73 | 2.05 | 3.13 |
| | % D | 17.20 | 48.65 | 74.16 |
| Sodium | D.O. DEP | 2.28 | 2.40 | 2.93 |
| Benzoate | % D | 68.11 | 71.86 | 87.57 |
| Toxicity Reference | D.O. DEP | 3.00 | 4.80 | 5.43 |

LUBRICITY

The reaction product of Example 1 was added to deionized (DI) waler and a standard lubricity test was conducted. The results are set forth in Table 5 and indicate that the additive of the present invention provides excellent lubricity to a drilling fluid.

TABLE 5

| SAMPLE | LUBRICITY COEFFICIENT[1] |
|---|---|
| DI water | 0.47 |
| 5 wt. % BIO-DRILL[2] in DI water | 0.10 |
| 5 wt. % Example 1 in DI water | 0.12 |

[1]per API RP 13B, 9th edition, 1992
[2]a polypropylene glycol based lubricant available from Baker Hughes, Inc.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A water based drilling fluid, comprising:
   (a) an aqueous drilling mud; and
   (b) a water-insoluble drilling fluid additive having the composition;

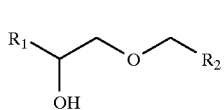 OR 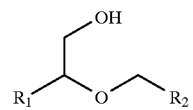

where $R_1$ and $R_2$ are aliphatic compounds and wherein $R_1$ has at least 8 carbons, and wherein the additive lowers the lubricity coefficient of the drilling fluid.

2. The drilling fluid of claim 1, wherein:
$R_1$ and $R_2$ are straight chain or have 1–3 branches.

3. The drilling fluid of claim 1, wherein:
$R_1$ has 8 to 16 carbons and $R_2$ has between 1 and 18 carbons.

4. The drilling fluid of claim 1, wherein:
$R_1$ has 8 to 16 carbons and $R_2$ has between 1 to 18 carbons.

5. The drilling fluid of claim 1, wherein:
the aqueous medium has from about 1 to about 15 volume % of the drilling fluid additive.

6. The drilling fluid of claim 1, wherein:
the lubricity coefficient of the drilling fluid is less than 0.4.

7. A water based drilling fluid, comprising:
(a) an aqueous drilling mud; and
(b) a drilling fluid additive composition comprising a water-insoluble ether having at least one hydroxyl group as a substituent, the ether being the reaction of an alcohol with an epoxide having at least 10 carbon atoms, wherein the ether lowers the lubricity coefficient of the drilling fluid.

8. The drilling fluid of claim 7, wherein:
the ether is derived from the reaction product between an alpha epoxide and an alcohol selected from the group consisting of tripropylene glycol bottoms, oleyl alcohol and ethoxylated alcohols.

9. The drilling fluid of claim 7, wherein:
the ether comprises the reaction product between 2-ethylhexanol and the epoxide of 1-hexadecene.

10. The drilling fluid of claim 7, wherein:
the aqueous medium has from about 1 to about 15 volume % of the drilling fluid additive composition.

11. The drilling fluid of claim 7, wherein:
the lubricity coefficient of the drilling fluid is less than 0.4.

12. A drilling fluid additive composition, comprising:
a weighting agent and a water-insoluble additive derived from the reaction product between an alpha epoxide having at least 10 carbons and an alcohol selected from the group consisting of tripropylene glycol bottoms, oleyl alcohol and ethoxylated alcohols.

13. The drilling fluid additive composition of claim 12, wherein:
the lubricity coefficient of the drilling fluid is lowered to less than 0.4.

14. A spotting fluid composition suitable for use in downhole drilling operations in a pill for releasing periodically stuck drillstring or casing, comprising:
(a) an aqueous medium, at least one component selected from the group consisting of drilling muds, anticaking agents, grinding agents, antigelation agents, suspension agents, and alkalinity control agents, and a weighting agent; and
(b) a water-insoluble ether having at least one hydroxyl group as a substituent, the ether being the reaction of an alcohol with an epoxide having at least 10 carbon atoms, wherein the ether lowers the lubricity coefficient of the drilling fluid.

15. The spotting fluid composition of claim 14, wherein:
the lubricity coefficient of the drilling fluid is lowered to less than 0.4.

16. An improved method of releasing a stuck drill string in the borehole of an underground formation during drilling operations employing an aqueous drilling fluid which comprises contacting the stuck drill string with an additive composition effective to reduce the annular pressure exerted by the drilling fluid against the stuck drill string and to release the stuck drill string, the additive composition comprising:
a water-insoluble ether having at least one hydroxyl group as a substituent derived from an epoxide, the epoxide having at least 10 carbon atoms, wherein the ether lowers the lubricity coefficient of the drilling fluid.

17. The method of claim 16, wherein:
the lubricity coefficient of the drilling fluid is less than 0.4.

18. A method of preventing sticking of tubular equipment in the wellbore of a subterranean well in the drilling, completion, or workover of such well, comprising:
(a) preparing a water based drilling fluid;
(b) adding to the water based drilling fluid an additive comprising a water-insoluble ether having at least one hydroxyl group as a substituent, the ether being the product of reaction of an alcohol with an epoxide having at least 10 carbon atoms, wherein the ether lowers the lubricity coefficient of the drilling fluid; and
(c) circulating the drilling fluid into, through, and out of the tubular equipment into the subterranean well, whereby the drilling fluid contacts the bore hole wall of the well.

19. The method of claim 18, wherein:
the water based drilling fluid has from about 1 to about 15 volume % of the drilling fluid additive composition.

20. The method of claim 18, wherein:
the lubricity coefficient of the drilling fluid is less than 0.4.

21. A method of preventing sticking of tubular equipment in the wellbore of a subterranean well in the drilling, completion, or workover of such well, comprising:
(a) preparing a water-based drilling fluid;
(b) adding to the water-based drilling fluid a water-insoluble additive comprising;

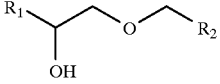

where $R_1$ and $R_2$ are aliphatic compounds and wherein $R_1$ has at least 8 carbons, wherein the additive lowers the lubricity coefficient of the drilling fluid; and
(c) circulating the drilling fluid into, through, and out of the tubular equipment into the subterranean well, whereby the drilling fluid contacts the bore hole wall of the well.

22. The method of claim 21, wherein:
the lubricity coefficient of the drilling fluid is less than 0.4.

23. A method of providing drilling fluid through tubular equipment in the wellbore of a subterranean well in the drilling, completion, or workover of such well, comprising the steps of:
(a) preparing a water based drilling fluid;
(b) adding to the water based drilling fluid an additive comprising a water-insoluble ether having at least one hydroxyl group as a substituent, the ether being the product of the reaction of an alcohol with an epoxide having at least 10 carbon atoms, wherein the ether lowers the lubricity coefficient of the drilling fluid; and
(c) circulating the drilling fluid into, through, and out of the tubular equipment into the subterranean well, whereby the drilling fluid contacts the bore hole wall of the well.

24. The method of claim 23, wherein:
the lubricity coefficient of the drilling fluid is lowered to less than 0.4.

25. A method of providing drilling fluid through tubular equipment in the wellbore of a subterranean well in the drilling, completion, or workover of such well, comprising the steps of:
(a) preparing a water-based drilling fluid;
(b) adding to the water-based drilling fluid a water-insoluble additive comprising;

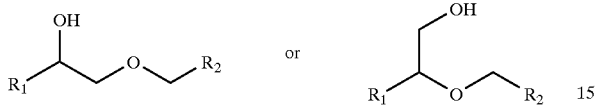

where $R_1$ and $R_2$ are aliphatic compounds and wherein $R_1$ has at least 8 carbons, wherein the additive lowers the lubricity coefficient of the drilling fluid; and
(c) circulating the drilling fluid into, through, and out of the tubular equipment into the subterranean well, whereby the drilling fluid contacts the bore hole wall of the well.

26. The method of claim 25, wherein:
the lubricity coefficient of the drilling fluid is lowered to less than 0.4.

27. A drilling fluid additive composition, comprising:
a weighting agent, at least one component selected from the group consisting of drilling muds, anticaking agents, grinding agents, anti-gelation agents, suspension agents, and alkalinity control agents, and a water-insoluble additive derived from the reaction product between an alpha epoxide having at least 10 carbons and an alcohol selected from the group consisting of tripropylene glycol bottoms, oleyl alcohol and ethoxylated alcohols.

28. A drilling fluid additive composition, comprising:
barite and at least one component selected from the group consisting of drilling muds, anticaking agents, grinding agents, anti-gelation agents, suspension agents, and alkalinity control agents, and a water-insoluble additive derived from the reaction product between an alpha epoxide having at least 10 carbons and an alcohol selected from the group consisting of tripropylene glycol bottoms, oleyl alcohol and ethoxylated alcohols.

29. A spotting fluid composition suitable for use in downhole drilling operations in a pill for releasing periodically stuck drillstring or casing, comprising:
(a) an aqueous medium, at least one component selected from the group consisting of drilling muds, anticaking agents, grinding agents, antigelation agents, suspension agents, and alkalinity control agents, and a weighting agent; and
(b) a water-insoluble ether having at least one hydroxyl group as a substituent, the ether being the reaction of an alcohol with an epoxide having at least 10 carbon atoms, wherein the ether lowers the lubricity coefficient of the drilling fluid.

30. A spotting fluid composition suitable for use in downhole drilling operations in a pill for releasing periodically stuck drillstring or casing, comprising:
(a) an aqueous medium, barite; and
(b) a water-insoluble ether having at least one hydroxyl group as a substituent, the ether being the reaction of an alcohol with an epoxide having at least 10 carbon atoms, wherein the ether lowers the lubricity coefficient of the drilling fluid.

* * * * *